United States Patent
Kirsch et al.

(10) Patent No.: US 7,720,163 B2
(45) Date of Patent: May 18, 2010

(54) METHOD AND DEVICE FOR NOTCHING THE TRANSMISSION BAND OF AN ANALOG SIGNAL, IN PARTICULAR AN MB-OFDM SIGNAL

(75) Inventors: Miguel Kirsch, Conches (CH); Régis Cattenoz, Annemasse (FR); Stéphane Tanrikulu, Annemasse (FR); Chiara Cattaneo, Sergy (FR); Fédérico Corsi, Geneva (CH)

(73) Assignee: STMicroelectronics N.V., Amsterdam (NL)

( * ) Notice: Subject to any disclaimer, the term of this patent is extended or adjusted under 35 U.S.C. 154(b) by 819 days.

(21) Appl. No.: 11/612,846

(22) Filed: Dec. 19, 2006

(65) Prior Publication Data
US 2007/0147524 A1    Jun. 28, 2007

(30) Foreign Application Priority Data
Dec. 20, 2005  (EP)  ................................. 05027942

(51) Int. Cl.
*H04K 1/10*  (2006.01)
*H04L 27/28*  (2006.01)
(52) U.S. Cl. ........................ 375/260; 375/259; 375/295; 375/296
(58) Field of Classification Search ................ 375/259, 375/260, 295, 296
See application file for complete search history.

(56) References Cited

U.S. PATENT DOCUMENTS

| | | | |
|---|---|---|---|
| 6,721,355 B1 * | 4/2004 | McClennon et al. | 375/222 |
| 6,873,650 B1 | 3/2005 | Banerjea et al. | 375/219 |
| 7,046,694 B2 * | 5/2006 | Kumar | 370/487 |
| 7,418,043 B2 * | 8/2008 | Shattil | 375/260 |

FOREIGN PATENT DOCUMENTS

WO    00/31938    6/2000

* cited by examiner

*Primary Examiner*—Ted M Wang
(74) *Attorney, Agent, or Firm*—Lisa K. Jorgenson; Allen, Dyer, Doppelt, Milbrath & Gilchrist, P.A.

(57) ABSTRACT

The transmission band of an analog signal to be transmitted is notched, including sub-carriers to be modulated from digital modulation coefficients respectively associated with the sub-carriers. The method includes providing an initial digital signal from successive frequency-domain groups each containing the digital modulation coefficients respectively associated to the sub-carriers. The initial signal is filtered with a frequency resolution greater than the frequency resolution of the frequency-domain groups to remove frequencies corresponding to the sub-carriers to be removed. The filtered signal is windowed using a windowing mask having a representation in the frequency-domain including a main lobe and secondary lobes. The power spectrum of the lobes decrease faster than the inverse of the frequency squared.

36 Claims, 16 Drawing Sheets

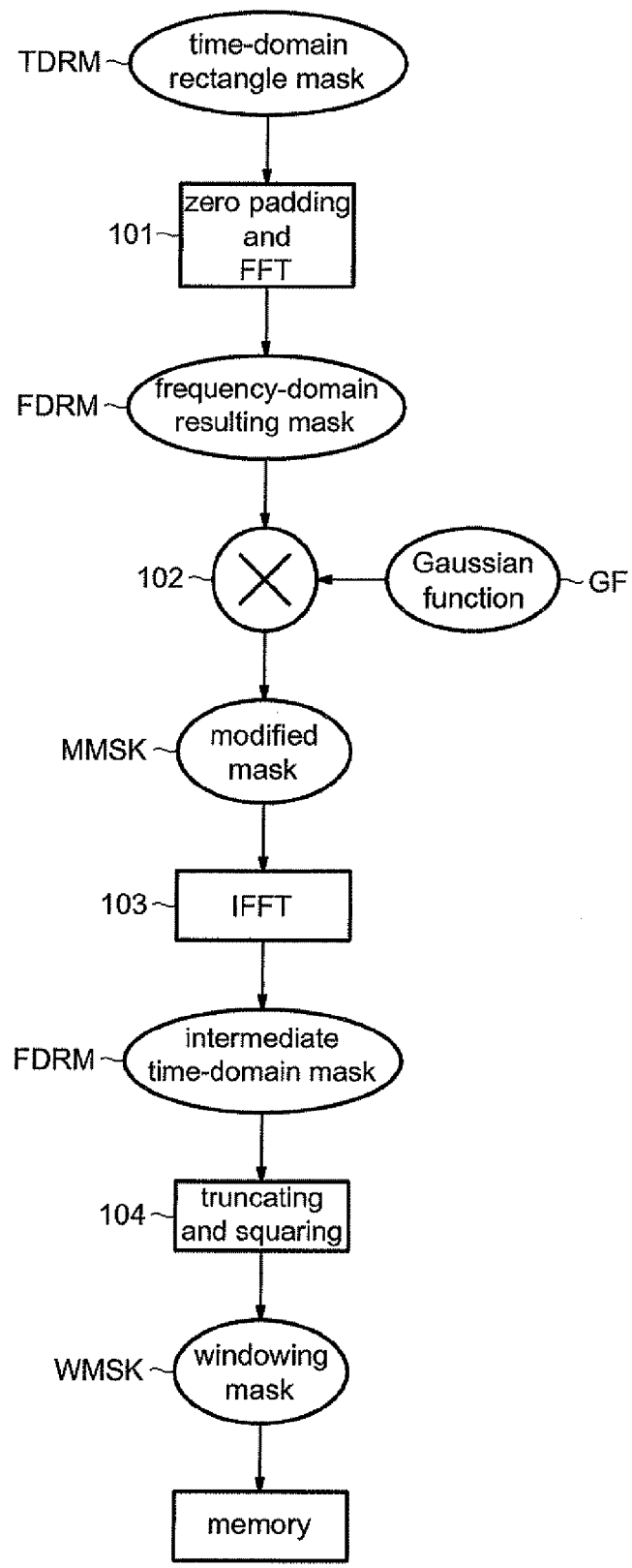

METHOD AND DEVICE FOR NOTCHING THE TRANSMISSION BAND OF AN ANALOG SIGNAL, IN PARTICULAR AN MB-OFDM SIGNAL

FIELD OF THE INVENTION

The invention relates to wireless communication systems, especially to level attenuation within a given transmission band, and more particularly, for processing interferences within different wireless communication apparatuses.

A non-limitative application of the invention is directed to devices operating according to the Ultra Wide Band (UWB) standard based on a multiband OFDM (Orthogonal Frequency-Division Multiplexing) modulation scheme, called MB-OFDM, which can generate interferences towards other wireless systems, and particularly a WIMAX device which is a fix wireless device (Worldwide Interoperability for Microwave Access). Such a WIMAX device operates for example with a bandwidth of 20 MHz at a central frequency of 3.5 GHz, whereas the frequency band of the MB-OFDM system lies between 3.1 and 10.6 GHz.

BACKGROUND OF THE INVENTION

Wireless personal area networks based on OFDM and UWB technologies like the MB-OFDM standard will directly interfere with narrowband interferers that are close to such wide band devices. At present, no specific interference mitigation techniques are implemented in the UWB standard based on OFDM.

Orthogonal frequency-Division Multiplexing (OFDM) is a method of digital modulation in which a signal is split into several narrowband channels (sub-carriers) at different frequencies. To avoid in-band spectral interference, it is proposed to reach a given attenuation level within a given transmission band of the interfering signal.

For example, one method includes modulating (or zeroing) the transmitted sub-carriers located within the given transmission band to try to cancel the signal energy found in this given band. However, because of side lobe amplitudes of the remaining transmitted sub-carriers, it is generally difficult to reach relatively high attenuation levels within a given band of the transmitted OFDM symbol. These side lobes are produced by the sin(x)/x shape spectrum of each transmitted sub-carrier.

In particular, in the coexistence perspective of MB-OFDM systems with other wireless systems, and particularly with WiMax, notches of as much as −30 dB with respect to the OFDM sub-carriers transmission power are requested.

Another type of method permitting one to obtain relatively high attenuation levels within a given band of a transmitted signal is disclosed in "Active Interference Cancellation Technique for MB-OFDM Cognitive Radio," Hirohisa Yamaguchi, 34$^{th}$ European Microwave Conference—Amsterdam 2004.

More precisely, according to this method, the band between sub-carriers $s_1$ and $s_2$ of an OFDM symbol is notched by: 1) zeroing every sub-carrier between $s_1$ and $s_2$, 2) modulating sub-carriers $s_1$ and $s_2$ using coefficients computed as a function of the OFDM symbol transmitted data, with the target of minimizing the energy in the band $s_1$-$s_2$.

However, such a method is relatively complicated to implement.

SUMMARY OF THE INVENTION

An object of the invention is to provide a totally different approach to the problem of level attenuation within a part of the transmission band of a signal to be transmitted.

This approach is particularly straightforward to implement and requires no changes in a receiver structure.

In other words, regardless of the kind of symbol that is transmitted, band notched or not, it is completely transparent to the receiver that operates in a standard mode.

Another object of the invention is to obtain deep band notching for MB-OFDM transmission systems, while substantially preserving the orthogonality between the sub-carriers.

One aspect of the invention is directed to a method based on filtering (either in frequency or time domain) the digital initial modulation signal with a frequency resolution higher than that of the initial modulation signal and windowing the filtered signal with a specific windowing mask.

More precisely, the method of notching the transmission band of an analog signal to be transmitted and including sub-carriers to be modulated from digital modulation coefficients respectively associated to the sub-carriers, the method comprises removing sub-carriers within the part of the transmission band to be notched.

Removing the sub-carriers may comprise providing an initial digital signal from successive frequency-domain groups each containing the digital modulation coefficients respectively associated to the sub-carriers, and filtering the initial signal with a frequency resolution greater than the frequency resolution of said frequency-domain groups in order to remove frequencies corresponding to the sub-carriers to be removed. The filtered signal is windowed using a windowing mask having a representation in the frequency-domain including a main lobe and secondary lobes. The power spectrum of the lobes may decrease faster than the inverse of the frequency squared.

As mentioned above, the notching difficulties stem from the side lobes generated by the sin(x)/x spectrum shape of the transmitted sub-carriers. This spectrum shape results from the fact that the signal to be transmitted is not an infinite signal but has a limited duration. Mathematically, this spectrum shape results from multiplying a complex exponential by the rectangle function in the time domain, or equivalently, from convolving a delta function with a sin(x)/x function in the frequency domain.

The notching difficulties resulting from the prior art methods can be overcome and higher attenuation level in the transmission band than those obtained with the prior art methods can be obtained by using in particular a combination of a filtering with a higher resolution and a windowing with a windowing mask, other than a rectangle function, having spectral properties leading to a faster amplitude decay of the side lobes. In other words, whereas the side lobes of a sinc function decrease as the inverse of the frequency squared is more or less important, the side lobes (i.e., the secondary lobes) of the frequency domain representation of the windowing mask decrease faster than the inverse of the frequency squared ($f^{-2}$).

Several conventional windows types can be used for that purpose, as for example the well-known Bartlett, Hanning, Hamming, and Blackman window function. Such window functions are for example detailed in the book "Discrete- Time Signal Processing", Oppenheim, Schafer, Prentice-Hall, 1989. However, depending on the type of windowing mask which is used, the depth of the notch in the transmission band is more or less important, or the orthogonality of the sub-carriers may be more or less affected.

The appropriate windowing mask may be chosen depending on the desired application. More precisely, in order to obtain a relatively deep notch without heavily affecting the orthogonality of the sub-carriers, it is preferable that the elaboration of the windowing mask comprises the use of a Gaussian function. This is particularly the case for an MB-OFDM transmission system.

More particularly, elaborating the windowing mask comprises providing a time-domain rectangle mask, performing a time-domain to frequency-domain conversion processing of the rectangle mask with a resolution greater than the frequency resolution of the rectangle mask for obtaining a frequency-domain resulting mask, multiplying the resulting mask with a Gaussian function for obtaining a modified mask, performing a frequency-domain to time-domain conversion processing on the modified mask for obtaining an intermediate time-domain mask, and truncating the intermediate time-domain mask.

The variance of the Gaussian function has an effect on the depth of the notch and on the orthogonality of the transmitted sub-carriers. For example, in a first approximation, larger variances generating windowing masks closer to the rectangle function lead to weaker depth notches and better orthogonality preservation of the transmitted sub carriers.

Conversely, smaller variances lead to larger depth notches and worse orthogonality preservation of the transmitted sub-carriers. Again, those skilled in the art will be able to choose the variance according to the desired application. In particular, for MB-OFDM transmission systems, an acceptable interval of variance values is [10, 150].

Many possibilities exist for performing the different steps of this aspect of the invention. More precisely, according to an embodiment of the invention, it is possible to directly use the successive groups of digital modulation coefficients. In other words, according to this embodiment, providing the initial signal may comprise providing successive initial frequency-domain symbols respectively corresponding to the successive groups of digital modulation coefficients.

It is also possible to directly work in the time-domain. In other words, according to such an embodiment, providing the initial signal comprises respectively performing successive frequency-domain to time-domain conversion processing on the successive groups of digital modulation coefficients for obtaining successive initial time-domain symbols.

Turning now to the filtering step, filtering the initial signal may be performed either in the frequency-domain or in the time-domain. The frequency resolution of the filtering is preferably an integer multiple of the frequency resolution of the frequency-domain groups of digital modulation coefficients. For example, in an MB-OFDM application, if each frequency-domain group contains 128 digital modulation coefficients or samples, the filtering may be performed on 256 samples.

According to an embodiment in which the filtered signal is a frequency-domain signal, windowing the filtered signal may comprise performing a frequency-domain to time-domain conversion processing on the filtered signal before using the windowing mask.

In order to improve the notching, it is also particularly advantageous to adjust the number of bits with which the signal delivered by the windowing means (i.e., the windowed signal) is quantized. Although one or two quantization bits are already enough for leading to an improvement of the notching, it is preferable that the digital to analog conversion processing of the windowed signal be performed on a number of bits greater than 5, and preferably equal to 7.

In addition to filtering and windowing, an extension of the signal by a cyclic suffix may be provided. Such an embodiment permits, in particular, one to recover almost completely the windowing distortion.

In other words, according to such a variation, providing the initial signal comprises respectively performing successive frequency-domain to time-domain conversion processing on the successive groups of digital modulation coefficients for obtaining successive intermediate time-domain symbols, and adding a suffix to each intermediate symbol for obtaining successive initial time-domain symbols. The suffix of an intermediate symbol may be a copy of at least the first sample of the intermediate symbol.

Each group of modulation coefficients may comprise a first number of modulation coefficients, for example 128, corresponding to a first number of modulated sub-carriers. The signal to be transmitted may comprise successive time-domain symbols including a second number of samples, for example 165. The second number may be greater than the first number. The suffix of an intermediate symbol is a copy of the N first samples of the intermediate symbol, with N being greater than one and smaller than the difference between the second number and the first number. For example, N may be equal to 8. With such an embodiment of the invention using this cyclic suffix, the variance of the Gaussian function is preferably greater than or equal to 20 and smaller than or equal to 60.

Another aspect of the invention is directed to a device for notching the transmission band of an analog signal to be transmitted and including sub-carriers to be modulated from digital modulation coefficients respectively associated to the sub-carriers. The device may comprise processing means adapted to remove sub-carriers within the part of the transmission band to be notched.

According to a general feature of this aspect of the invention, the processing means may comprise an input for receiving successive frequency-domain groups each containing the digital modulation coefficients respectively associated to the sub-carriers, and preprocessing means or a preprocessor adapted to provide an initial digital signal from the successive frequency-domain groups. Filtering means or a filter may be adapted to filter the initial signal with a frequency resolution greater than the frequency resolution of the frequency-domain groups in order to remove frequencies corresponding to the sub-carriers to be removed. Windowing means may be adapted to window the filtered signal using a windowing mask having a representation in the frequency-domain including a main lobe and secondary lobes. The power spectrum of the lobes maybe decreasing faster than the inverse of the frequency squared.

The windowing means may comprise for example, a memory containing digital mask coefficients or samples defining the windowing mask. The windowing coefficients may have been elaborated from a frequency-domain rectangle mask and a Gaussian function. Multiplication means or a multiplier may be adapted to multiply the filtered signal by the mask coefficients.

The initial signal may comprise successive initial frequency-domain symbols respectively corresponding to the successive groups of digital modulation coefficients. In such an embodiment, the processing means does not modify the digital modulation coefficients, and can be considered for example as comprising only the connection between the input of the processing means and the filter.

The preprocessing means may comprise frequency-domain to time-domain conversion processing means adapted to respectively perform successive frequency-domain to time-domain conversion processing on the successive groups of digital modulation coefficients for obtaining successive initial time-domain symbols.

More particularly directed to the suffix variation, the preprocessing means may comprise frequency-domain to time-domain conversion processing means adapted to respectively perform successive frequency-domain to time-domain conversion processing on the successive groups of digital modulation coefficients for obtaining successive intermediate time-domain symbols, and adding means or an adder for adding a suffix to each intermediate symbol for obtaining successive initial time-domain symbols. The suffix of an intermediate symbol may be a copy of at least the first sample of the intermediate symbol.

The filtering means may be adapted to perform the filtering of the initial signal either in the frequency-domain or in the time-domain. When the filtering signal is a frequency-domain signal, the windowing means may comprise frequency-domain to time-domain conversion processing means adapted to perform a frequency-domain to time-domain conversion processing on the filtered signal before using the windowing mask.

The device may further comprise a digital-to-analog conversion stage coupled to the output of the windowing means and arranged to perform a digital-to analog conversion of the windowed signal on a number of bits greater than 5. The signal to be transmitted may be for example UWB signal modulated according to a MB-OFDM modulation scheme.

Yet another aspect of the invention is directed to a transmitter comprising a device as defined above. The transmitter may belong to an MB-OFDM system.

BRIEF DESCRIPTION OF THE DRAWINGS

Other advantages and features of the invention will appear on examining the detailed description of embodiments, these being in no way limiting, and of the appended drawings in which:

FIGS. 17 to 21 illustrate more particularly another embodiment of the invention directed to the suffix variation.

DETAILED DESCRIPTION OF THE PREFERRED EMBODIMENTS

The invention will be now described in relation with MB-OFDM systems, although the invention is not limited to this particular application. Conventionally, a MB-OFDM digital baseband symbol is composed of 128 sub-carriers (corresponding to data, pilots, etc.). The transmitted data is generated by computing the IFFT (Inverse Fast Fourier Transform) of 128 frequency-domain digital baseband samples and padding the result with 37 zeroed samples. The whole symbol (165 samples) has a duration of 312.5 ns.

Most of the zero samples are used to cope with multipath channels, and some of them are used to give enough time to the radio subsystem for an eventual band switch (in TFI mode) between consecutive symbols.

Figure 1:
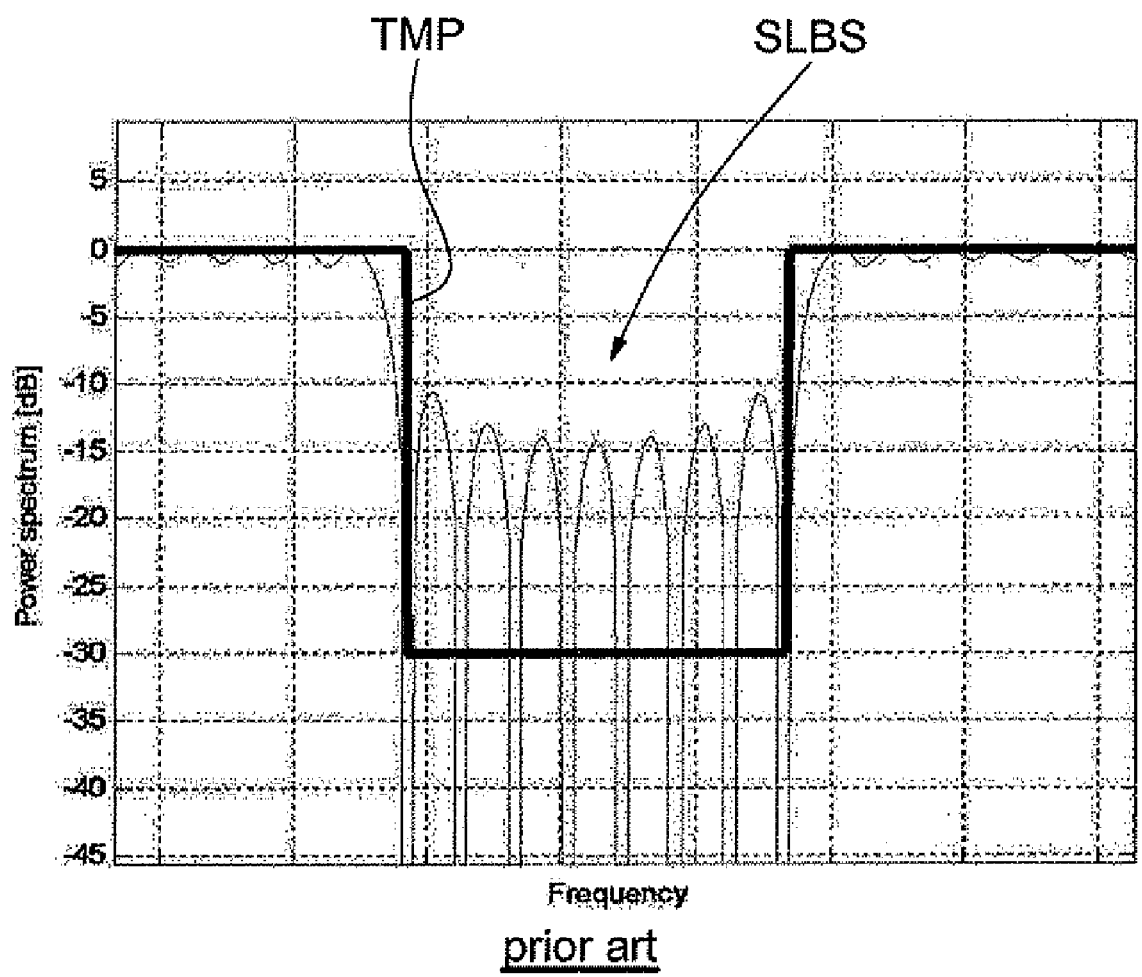
FIG. 1 is an example of an OFDM symbol power spectrum with 8 zeroed sub-carriers band according to the prior art.

An example of an OFDM symbol power spectrum with an 8 zeroed sub-carriers band (the eight removed sub-carriers are conventionally modulated by coefficients set to zero) is depicted in FIG. 1. It can be seen that despite the zeroed sub-carriers, the secondary lobes SLBS produced by the sinc shape spectrum of each transmitted sub-carrier, (i.e., the sub-carriers that have not been removed) are only below −10 dB. This is not complying with a notching mask TMP set at −30 dB, as for example requested in the context of MB-OFDM transmission schemes.

Figure 2:
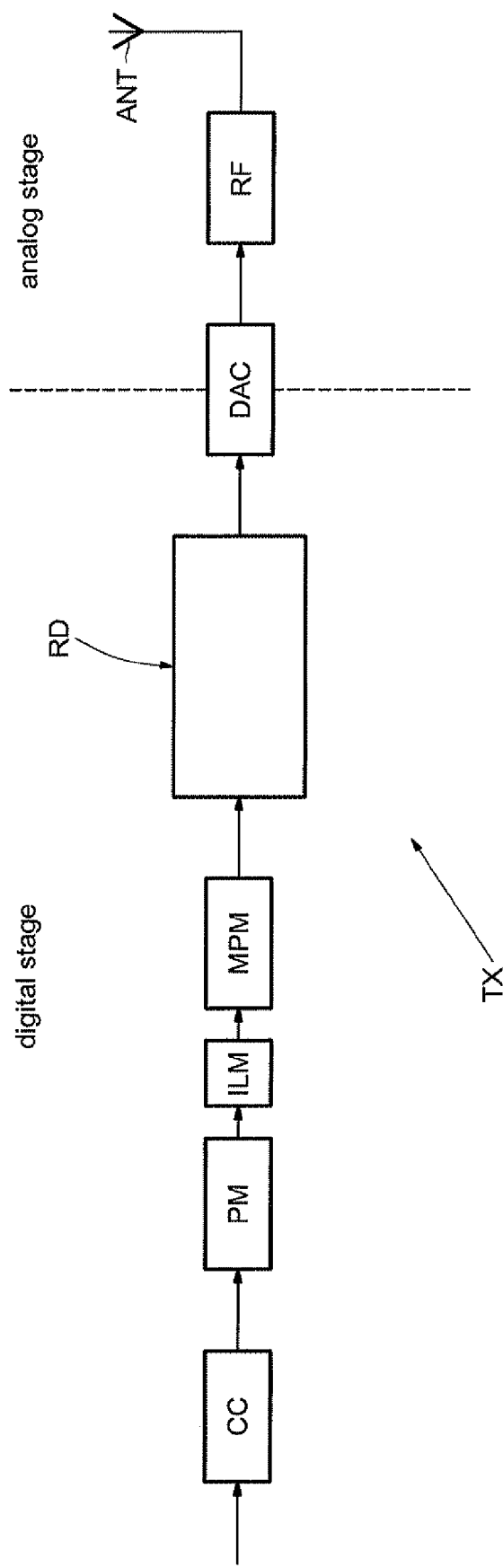
FIG. 2 illustrates a diagrammatically a transmitter according to an embodiment of the invention.

The invention will in particular permit one to bring about an approach to this problem. As depicted in FIG. 2, a transmitter TX according to an embodiment of the invention comprises a digital baseband stage coupled to an analog radio frequency stage by a digital-to-analog conversion stage DAC.

In a conventional manner, the transmission chain comprises an encoder CC, for example a convolutional encoder, receiving data from source coding means and delivering a bits stream to puncturing means PM which delivers punctured bits streams.

Interleaving means ILM are connected to the output of the puncturing means and are followed by mapping means MPM which map the bits into symbols according to a modulation mapping scheme depending on the kind of used modulation, for example a BPSK modulation or more generally a QAM modulation.

The successive symbols delivered by the mapping means MPM are MB-OFDM digital baseband symbols. Each symbol is a group containing 128 modulation coefficients respectively associated to 128 sub-carriers to be modulated accordingly. Of course, a group of 128 samples (modulation coefficients) is delivered on the I branch whereas another corresponding group of 128 samples is delivered on the Q branch.

These successive frequency-domain groups of digital modulation coefficients are then processed in processing means RD which are adapted to remove sub-carriers within a part of the transmission band to be notched. The means belonging to the digital baseband stage may be realized for example by software within a microprocessor. Another possibility would include realizing at least some of these means, for example IFFT or FFT means, by specific ASICs.

The time-domain symbols delivered by the processing means RD are then processed in a conventional radio frequency stage RF after having been converted into the DAC stage, and before being transmitted on air through antenna ANT.

Figure 3:
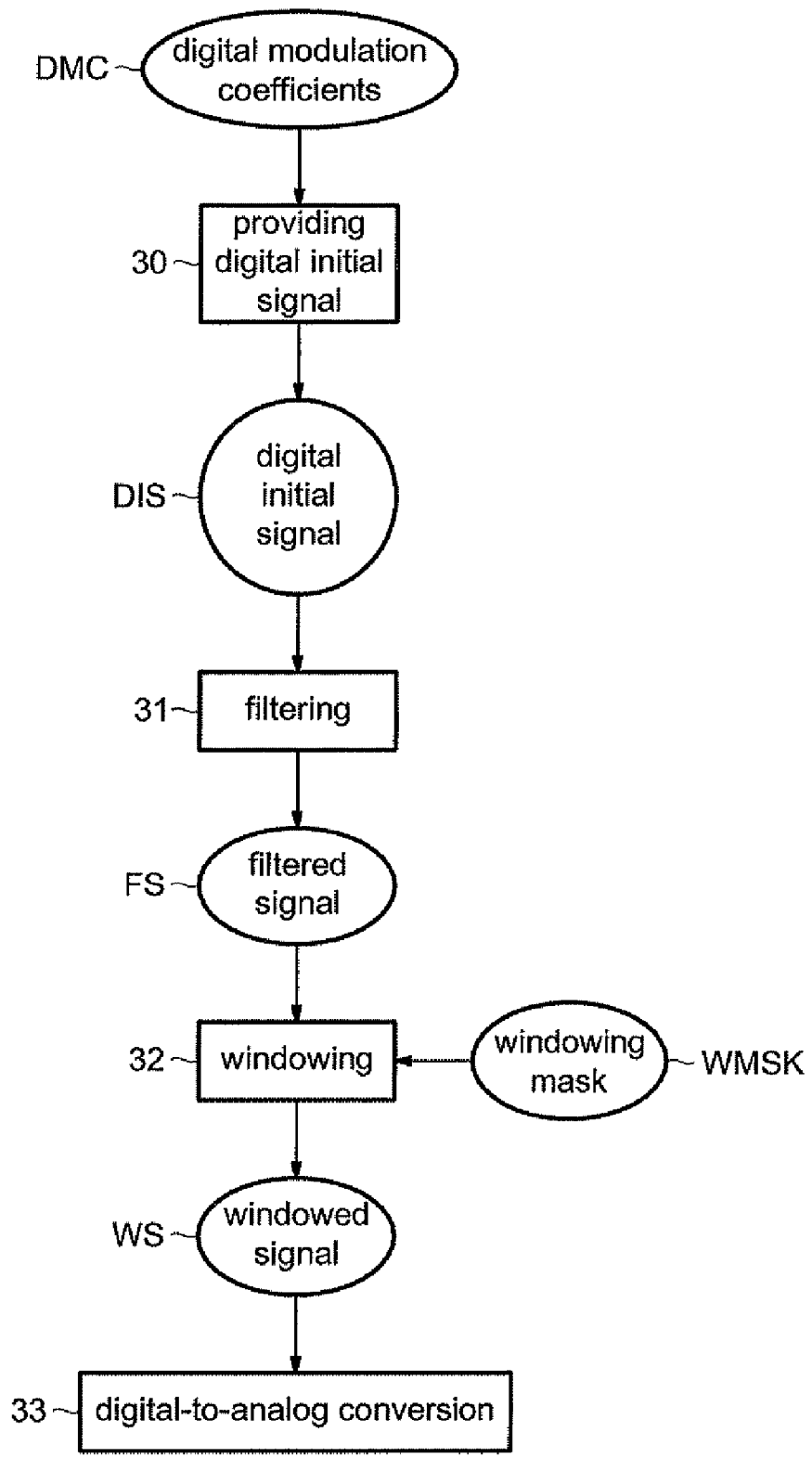
FIG. 3 illustrates diagrammatically a flow chart according to an embodiment of a method according to the invention.

As generally illustrated in FIG. 3, a digital initial signal DIS is provided (step 30) from the digital modulation coefficients DMC. Then, this digital initial signal is filtered (step 31) with a frequency resolution greater than the frequency resolution of the frequency-domain groups of the digital modulation coefficients DMC.

The filtered signal FS is then windowed (step 32) by using a windowing mask WMSK and the resulting digital windowed signal WS is converted (step 33) into an analog signal which will be processed by the radio-frequency stage RF.

Various possibilities exist for performing the steps of FIG. 3. A first variation will be now described with reference to FIGS. 4, 5 and 6 in particular.

Figure 5:
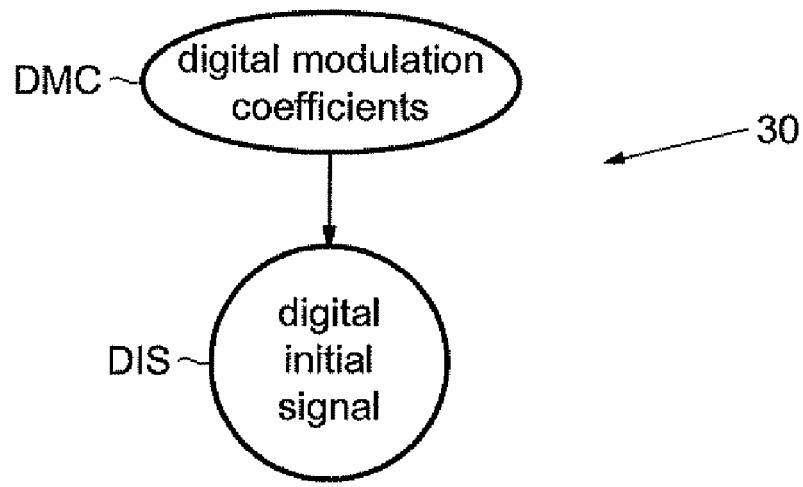

According to this variation, and as illustrated in FIG. 5, the digital modulation coefficients DMC are directly used for providing the digital initial signal DIS. More precisely, in such a case, the digital initial signal DIS comprises successive initial frequency-domain symbols respectively corresponding to the successive groups of digital modulation coefficients. In other words, the 128 samples of each initial frequency-domain symbol are the 128 corresponding digital modulation coefficients or samples.

This digital initial signal DIS will be then filtered with a frequency resolution greater than the frequency resolution of the groups of digital modulation coefficients. In other words, the length of the filtering, i.e., a number of samples (filter coefficients) used in the filtering, will be greater than the number of samples (here, 128) of each initial frequency-domain symbol. This will permit one to filter easily the undesired lobes between sub-carriers.

Figure 6:
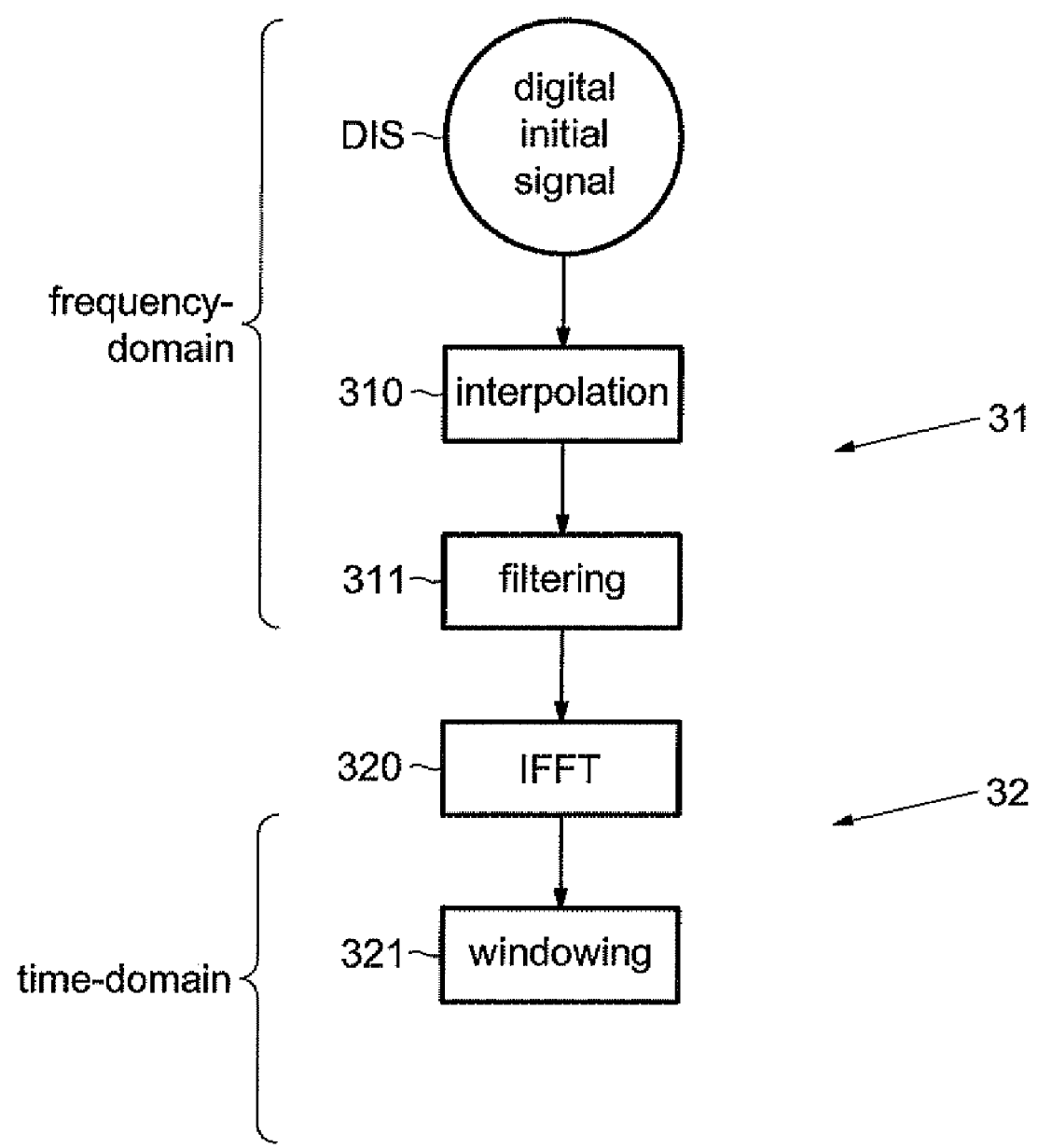

When working in the frequency-domain, as depicted in FIG. 6, the digital initial signal DIS is first interpolated (step 310). If we assume an interpolation factor equal to 2, 256 samples are obtained from the original 128 samples. The desired band to be notched, for example all frequencies between sub-carriers $S_1$ and $S_2$, can be easily notched, for example by setting the corresponding frequency coefficients of the filter to zero.

An interpolation in the frequency-domain can be easily performed by directly computing the interpolated version Y(n) of the frequency-domain signal X(n), with (X(n) being a group of 128 modulation coefficients.

More precisely, the interpolated version Y(n) is given by $$Y(n) = \frac{1}{M} \sum_{u=0}^{2M-1} \tilde{X}(u) Z(n-u),$$

where M=128 and $$\tilde{X}(u) = \begin{cases} X(k), & \text{for } u = 2k \\ 0, & \text{for } u = 2k+1 \end{cases} \text{ with } k \in [0, M-1]$$

$$Z(n) = \begin{cases} \dfrac{1 - e^{-j\pi n}}{1 - e^{-j\frac{\pi}{M}n}}, & \text{for } n \neq 0 \\ M, & \text{for } n = 0, \end{cases}$$

Of course, even if the filtering is performed in the frequency-domain, it would have been possible to make an interpolation in the time-domain. For example, the digital initial signal DIS could have been converted in the time-domain by an IFFT processing (Inverse Fast Fourier Transform) then zero-padded with 128 zeros, and then again converted in the frequency-domain by an FFT processing (Fast Fourier Transform). Practically, the FFT and IFFT operators are in fact preferably Discrete Fast Fourier Transform or Discrete Inverse Fast Fourier Transform operating on digital samples.

Figure 9:
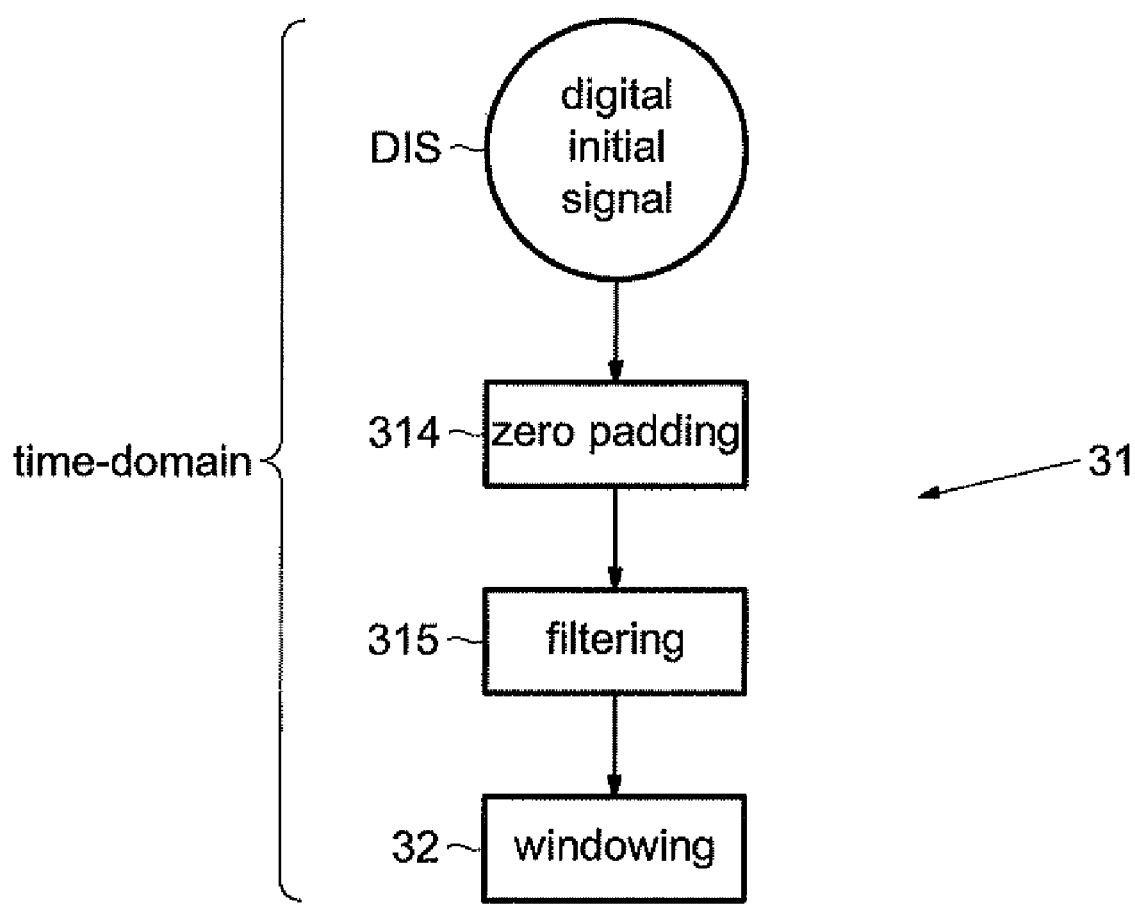

The filtered signal FS is then converted in the time-domain in frequency-domain to time-domain conversion processing means IFFTM (FIG. 4) performing Discrete Inverse Fast Fourier Transform 320 (FIG. 6). Alternatively, it is possible, as illustrated in FIGS. 7, 3 and 9 to work in the time-domain for the filtering step in particular.

Figure 7:
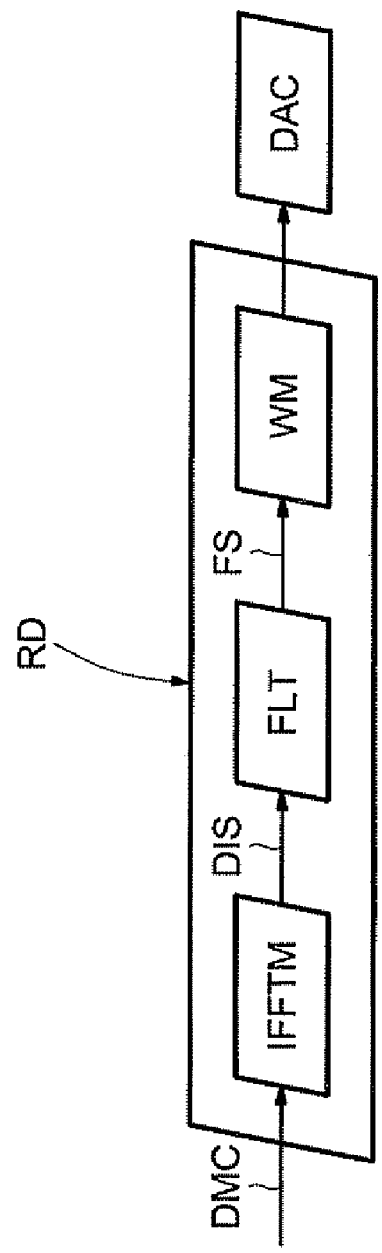
Figure 8:
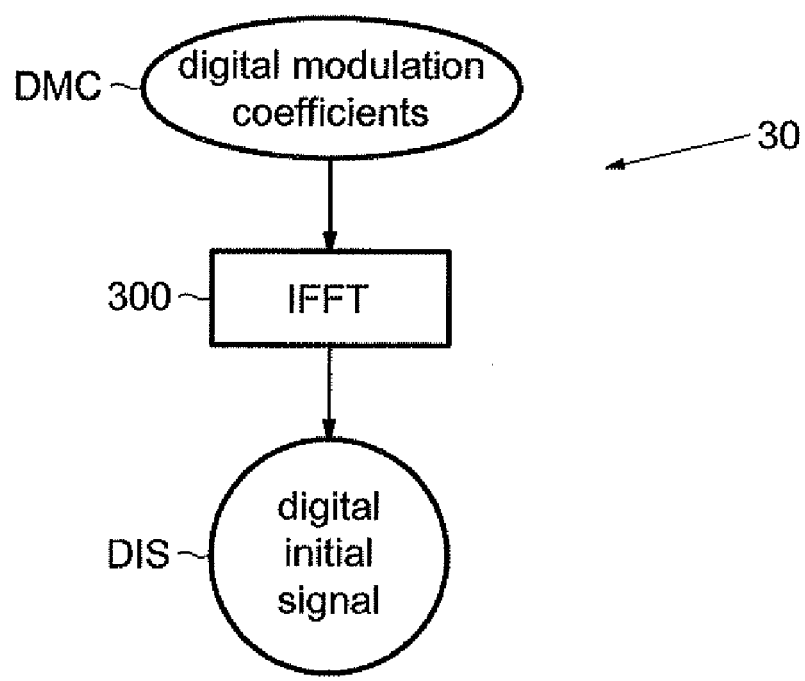

According to this variation, the digital initial signal DIS comprises successive initial time-domain symbols obtained from the successive groups of digital modulation coefficients DMC by using an IFFT processing 300 performed on means IFFTM (FIGS. 7 and 8). Then, the digital initial signal is zero-padded (step 314, FIG. 9) in the time-domain for obtaining time-domain symbols, each having 256 samples. The filtering step 315 is then performed directly in the time-domain.

In this respect, a possible embodiment can include computing the filter coefficients in the frequency-domain and then performing an IFFT processing on these filter coefficients for obtaining the filter coefficients in the time-domain which will be used in the filtering step 315. A truncation of the filtered signal to 165 samples would lead to a resulting notch not having a deep attenuation, in particular not having a deep attenuation of −30 dB as requested in the MB-OFDM standard. Thus, the filtered signal will be windowed by a windowing mask other than the rectangle function. This windowing step is performed in the time-domain.

Figure 4:
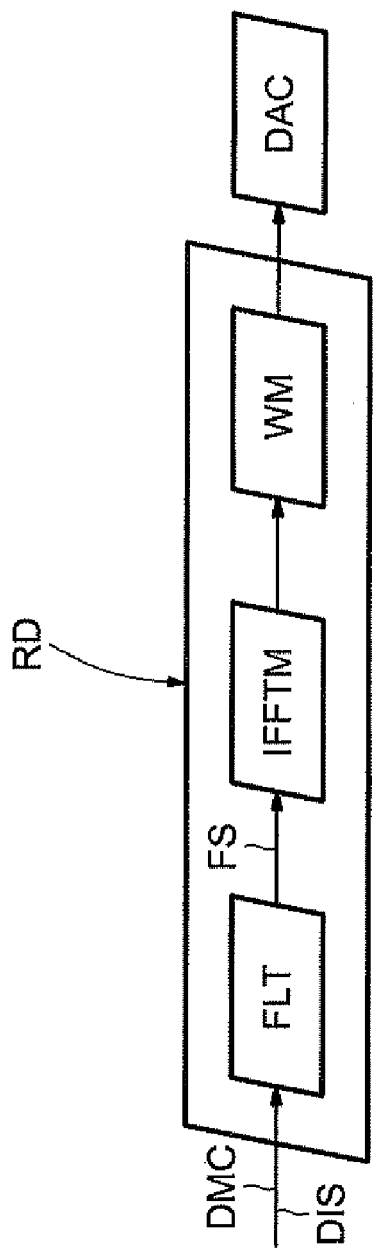
FIGS. 4 to 10 illustrate diagrammatically various embodiments of the invention.

Thus, if the filtering step is performed in the frequency domain, an IFFT processing 320 is necessary before performing the windowing step 321, as illustrated for example in FIG. 6 or in FIG. 4.

According to a preferred embodiment of the invention, elaborating the windowing mask comprises providing a time-domain rectangle mask, and performing a time-domain to frequency-domain conversion processing of the rectangle mask with a resolution greater than the frequency resolution of the rectangle mask for obtaining a frequency-domain resulting mask. The resulting mask is multiplied with a Gaussian function for obtaining a modified mask. A frequency-domain to time-domain conversion processing is performed on the modified mask for obtaining an intermediate time-domain mask. The intermediate time-domain mask is truncated.

Figure 10:
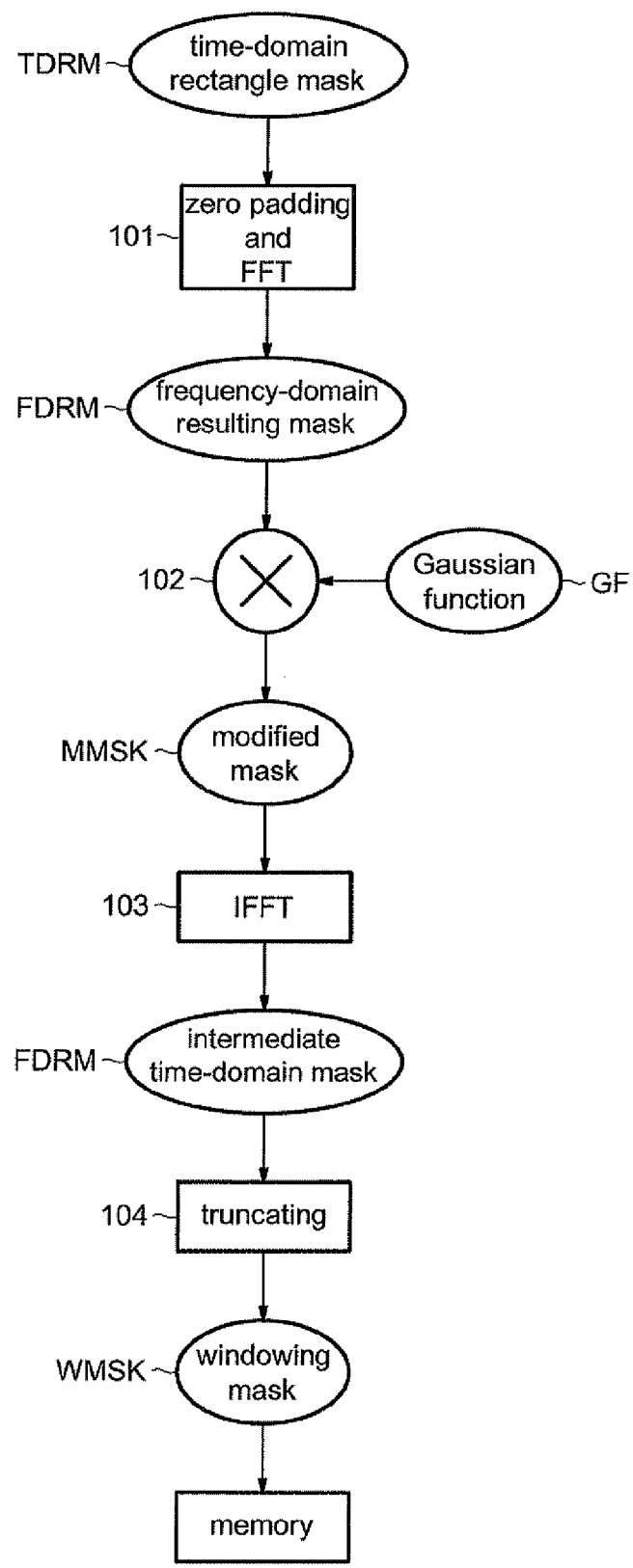

Such an embodiment can be for example implemented as illustrated diagrammatically in FIG. 10. More precisely, a time-domain rectangle mask having 165 samples, each sample been equal to 1 for example, is zero-padded to reach 256 samples and then converted in the frequency domain by using a FFT processing (step 101).

The frequency-domain resulting mask FDRM thus has a frequency resolution being twice the frequency resolution of the initial time domain rectangle mask. This frequency-domain resulting mask FDRM is then multiplied (step 102) by a Gaussian function GF for obtaining a modified mask MMSK, still having 256 samples. This modified mask is then converted in the time-domain by performing an IFFT processing 103.

The intermediate time-domain mask ITDM obtained after this IFFT processing, still having 256 samples, is then truncated (step 104) to 165 samples for obtaining the windowing mask WMSK. The time-domain mask samples of the windowing mask are then stored in a memory.

Figure 11:
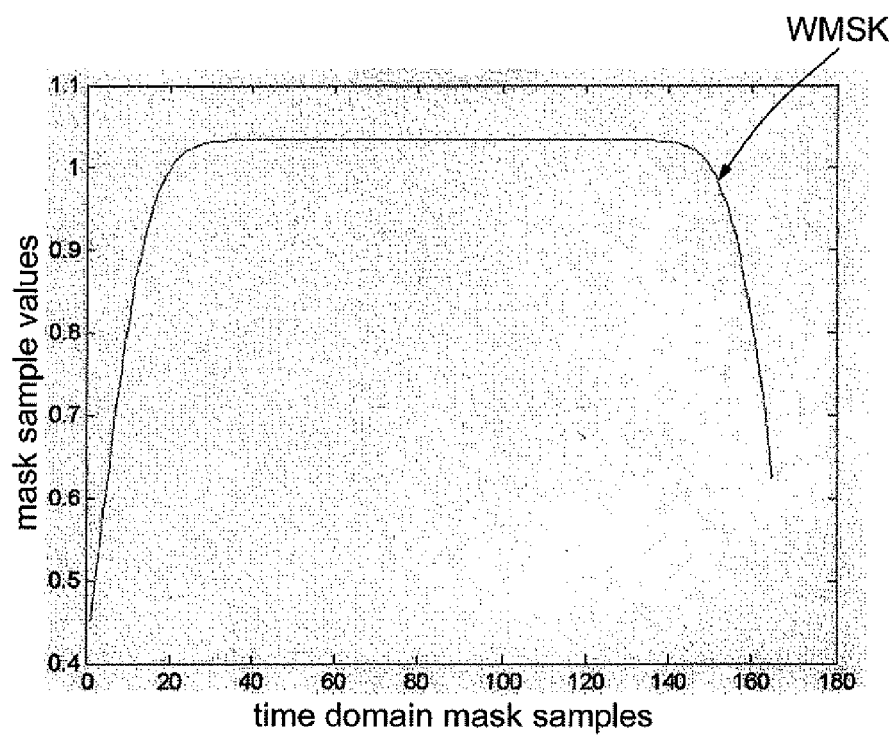
FIG. 11 is an example of a windowing mask according to the invention.

The discrete Gaussian function employed is defined by: $e^{-n^2/\sigma^2}$, where n∈Z. An acceptable interval of variance $\sigma^2$ values is [10,150]. For example, the variance may be equal to 30, which leads to the windowing mask depicted in FIG. 11 and having the mask sample values contained in Table 1 of Annex A thereafter. This Annex A is part of the description.

The standard MB-OFDM symbol has only 128 useful samples, where the missing 37 ones to reach 165 samples are set to zero. In the present variation, 165 samples are still used after truncation. And although the 37 last samples are not set to zero, this is not a problem since the power of the filtered signal over the last 37 samples is very low compared to the power of the first 128 useful samples.

Actually, the power of the symbol extension (last 37 samples) is even lower because after windowing and quantizing the signal, (with around 7 bits including sign) many of the 37 last samples are finally set to zero.

Adjusting the quantization in the digital-to-analog conversion stage permits one also to improve the notch depth. The quantization on a sufficient number of bits, preferably greater than five, permits one to attenuate the level of the signal ripples over the last 37 samples of each symbol.

Figure 12:
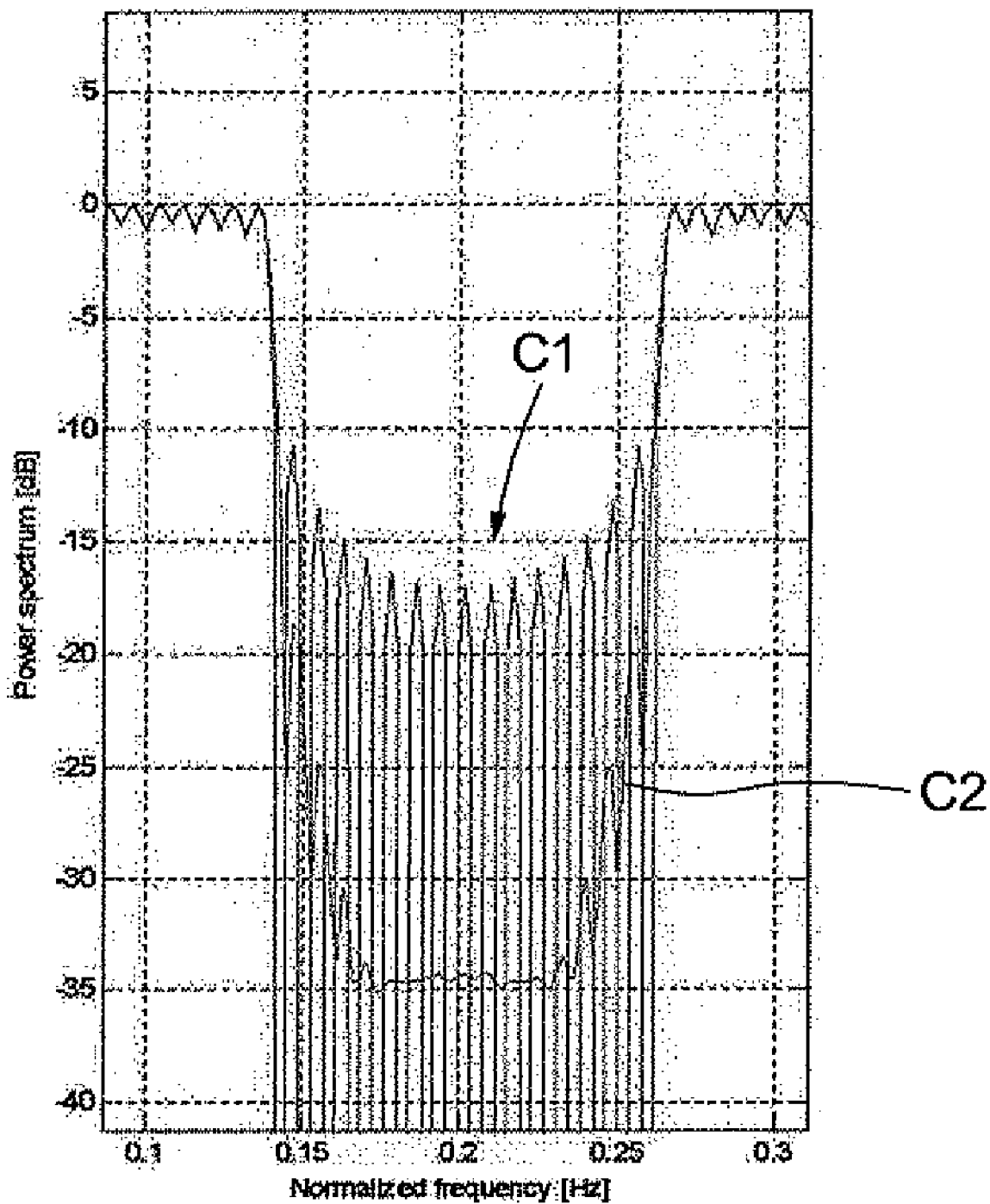
FIG. 12 illustrates a result example of the notching method according to the invention.

FIG. 12 depicts (curve C2) a symbol notched in which 16 sub-carriers have been removed. It can be seen that the depth of the notch is greater than −30 dB. This curve C2 is to be compared with curve C1 which represents the power spectrum of a symbol with 16 zeroed sub-carriers obtained by a method according to the prior art.

Figure 13:
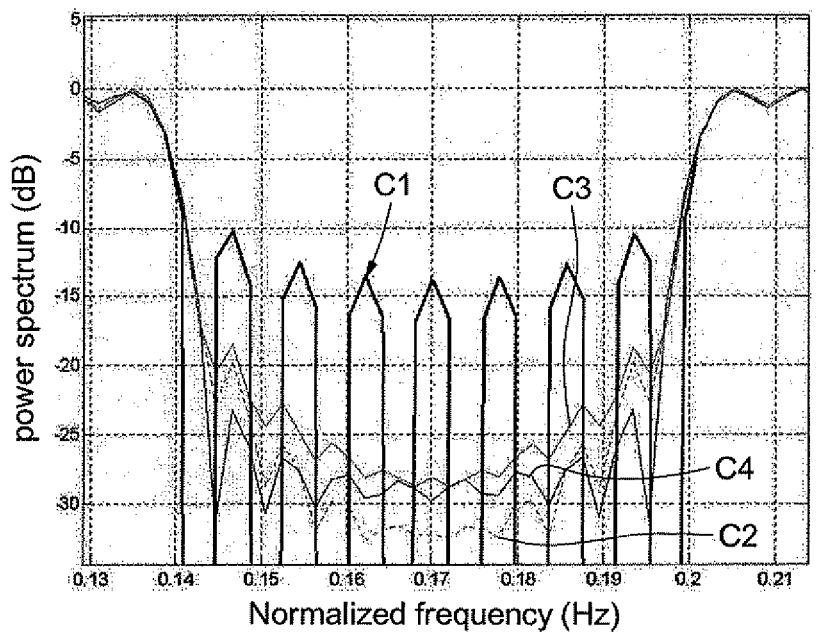
FIGS. 13 to 16 illustrate other examples of notched signal power spectrums and corresponding windowing masks in time and frequency domains in accordance with the invention.

FIG. 13 illustrates several notched signal power spectrums obtained using different variance values of the Gaussian function involved in the windowing mask elaboration. More precisely, whereas curve C1 still illustrates a power spectrum according to the prior art, curve C2 has been obtained with a Gaussian function having a variance equal to 30.

Figure 14:
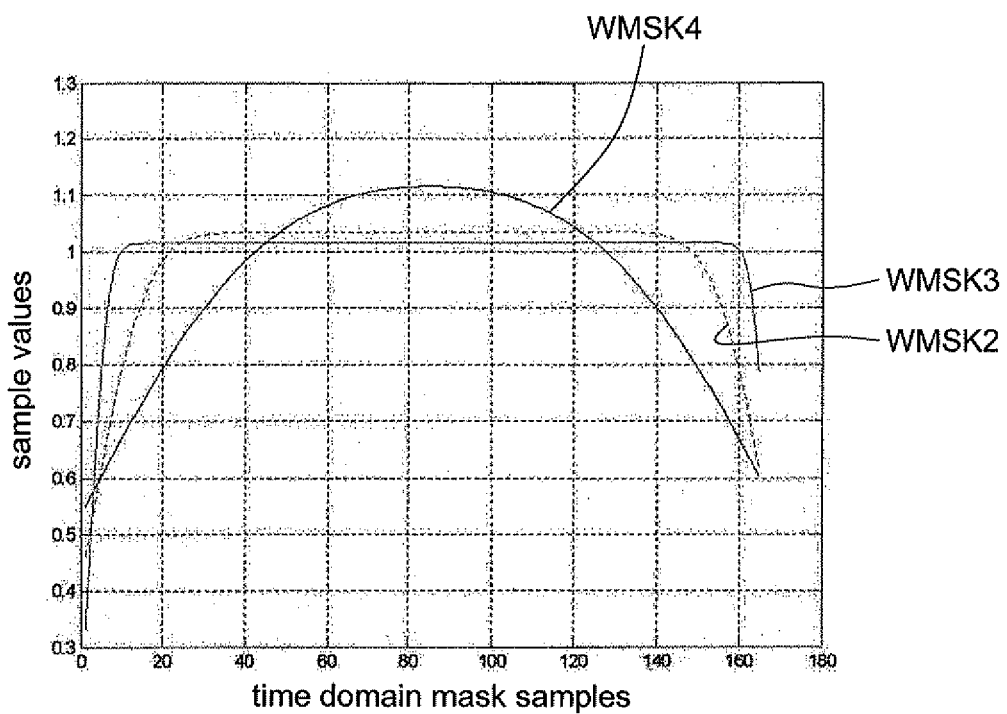

Curve C3 has been obtained with a Gaussian function having a variation equal to 300 whereas curve C4 has been obtained with a Gaussian function having a variance equal to 3. FIG. 14 illustrates the corresponding time-domain windowing mask WMSK2-WMSK4.

Figure 15:
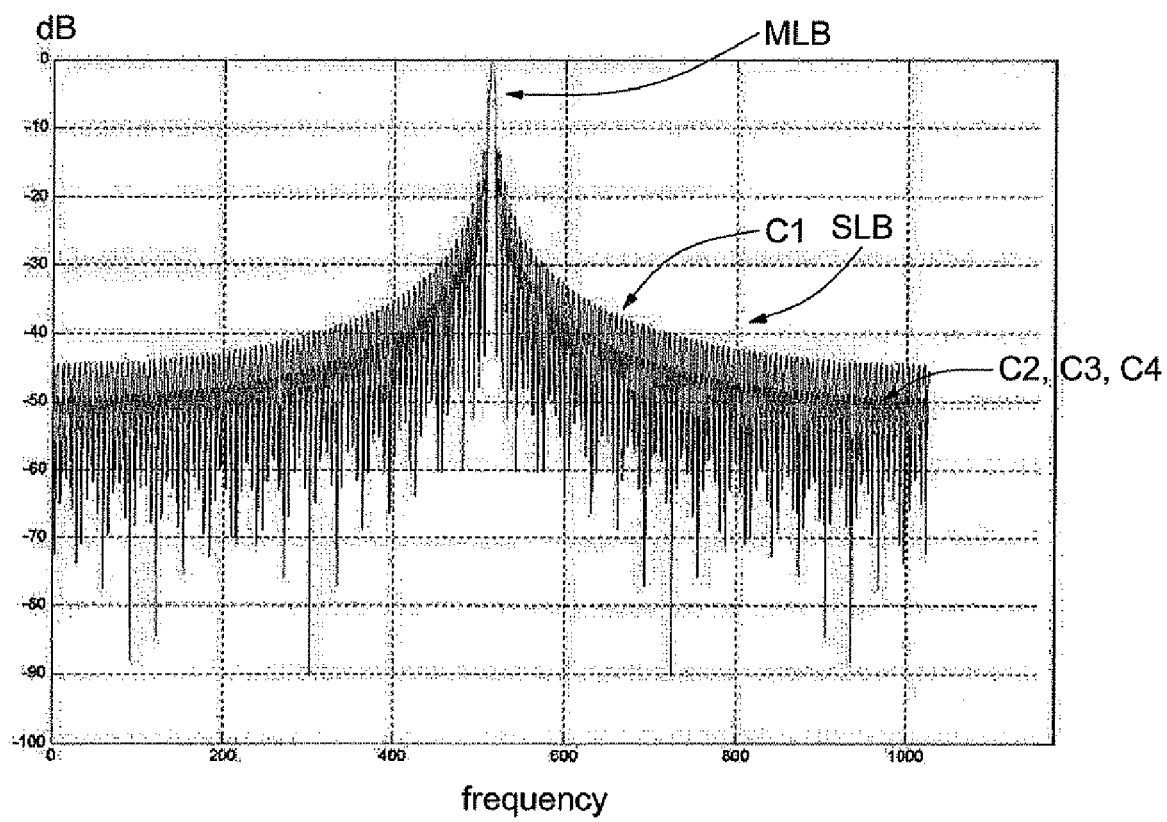
Figure 16:
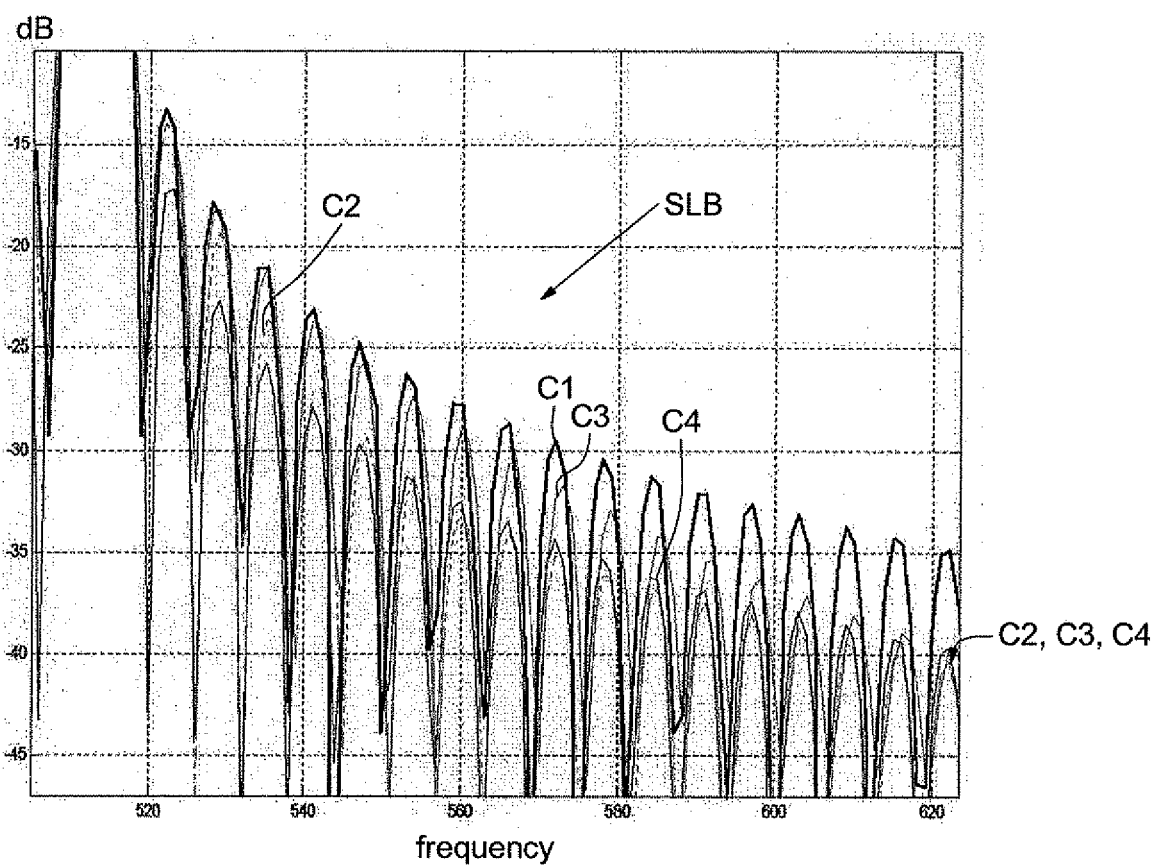

FIG. 15 illustrates the frequency representation (curve C1) of a rectangle function having 165 samples and the frequency representation (curves C2, C3 and C4) of the windowing masks WMSK2-WMSK3 of FIG. 14. Each curve has a main lobe MLB and secondary lobes SLB. But whereas the power spectrum of the secondary lobes of curve C1 decrease as the inverse of the frequency squared ($f^{-2}$) the secondary lobes of curves C2-C4 decrease faster than the inverse of frequency squared. This can be also seen in FIG. 16 that is an enlarged representation of the right part of FIG. 15.

Another variation of the invention will be now described with reference to 17 to 21. The main difference between this variation and the first variation which has been already described, stems from the extension of the transmitted symbol by a cyclic suffix before filtering and windowing.

Figure 18:
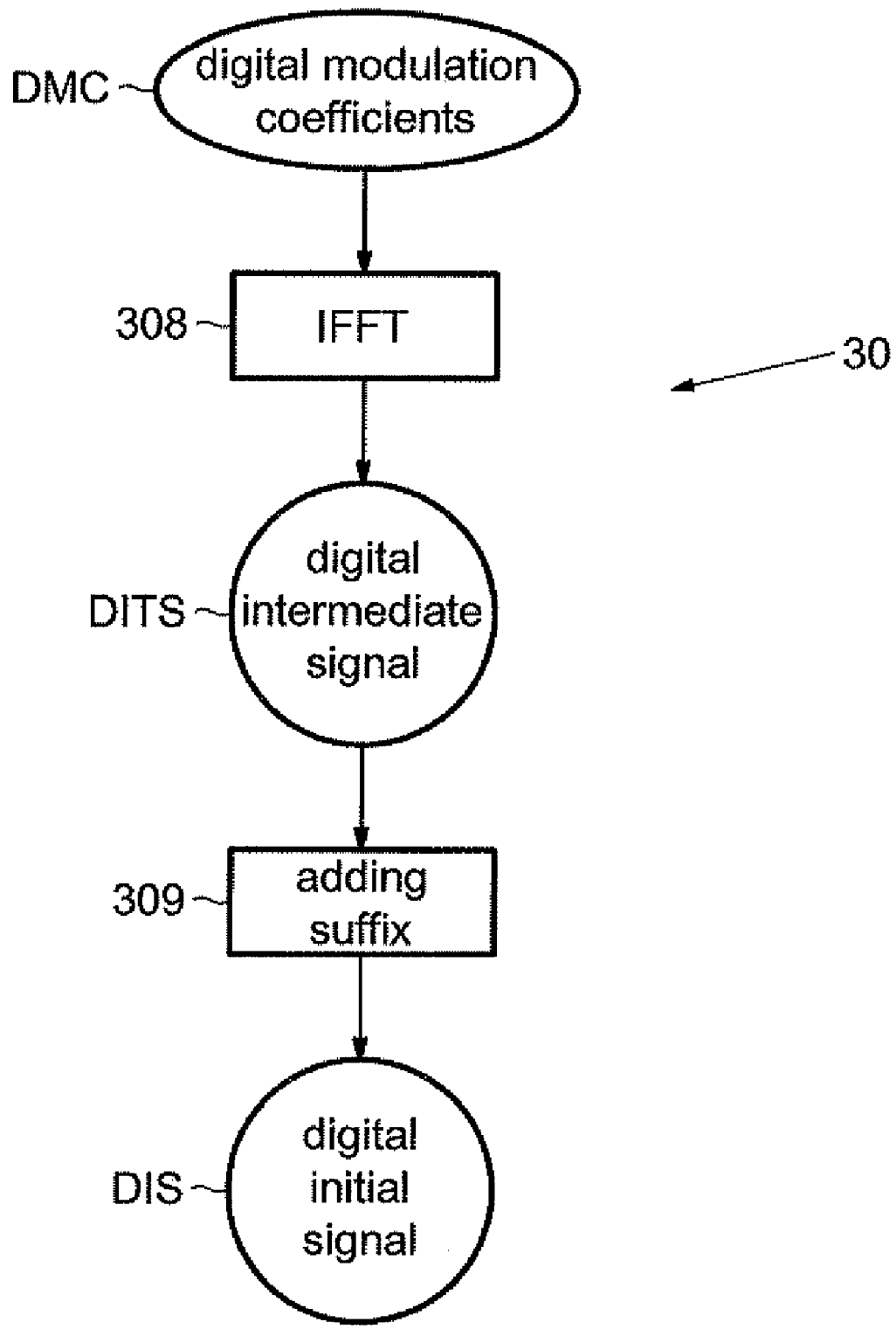

More precisely, as illustrated in particular in FIG. 18, providing the initial signal DIS comprises respectively performing successive frequency-domain to time-domain conversion processing on the successive groups of digital modulation coefficients DMC for obtaining successive intermediate time-domain symbols DITS, and adding a suffix (step 309) to each intermediate symbol for obtaining successive initial time-domain symbols forming the digital initial signal DIS. And, the suffix of an intermediate symbol is a copy of at least the first sample of the intermediate symbol.

Figure 17:
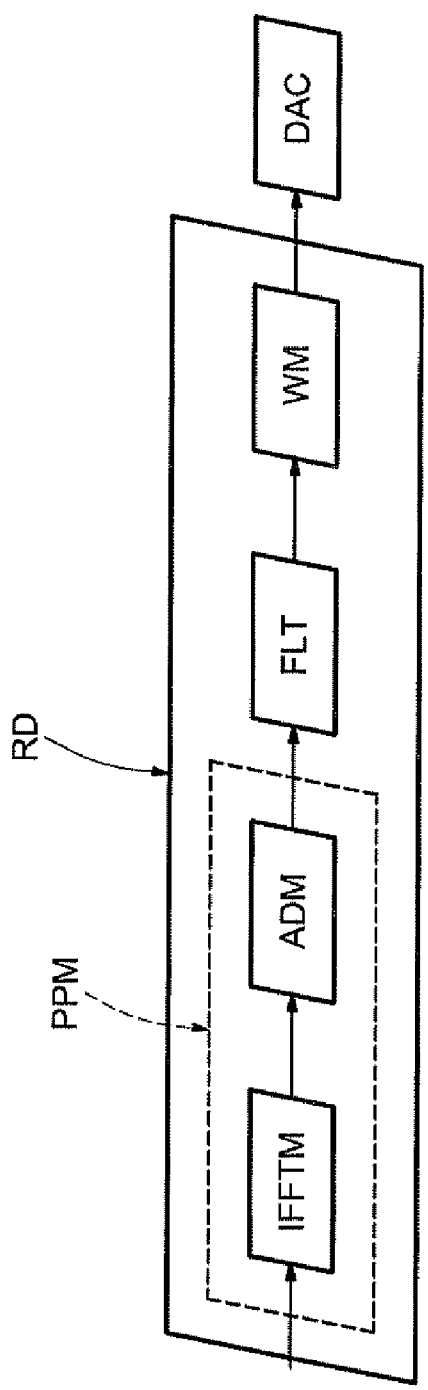

Preferably, in an MB-OFDM application, the cyclic suffix length has been set to 8 samples. This length is a good compromise between the desired window spectral properties and the need of a silent (zeroed) gap at the end of the symbol, long enough to cope with the channel multipath. The adding of the cyclic suffix is performed in pre-processing means PPM (FIG. 17) after the IFFT means referenced IFFTM. The filtering FLT is preferably made in the time-domain.

However, alternatively, as for the first variation of the invention, the filtering process after the suffix insertion can be done in the frequency-domain instead of the time-domain. In that case, one additional FFT and IFFT would be needed since the filtering process comes after the suffix insertion, which is done in the time-domain.

The notching method according to this second variation can be implemented as following: IFFT of the OFDM digital symbol (128 samples or digital modulation coefficients); adding the cyclic suffix of 8 samples; zero-padding to reach 256 samples and band notching (time-domain filtering); and signal windowing with a windowing mask having 128+8 (suffix length) useful samples and 29 zero samples to reach the number 165.

Figure 20:
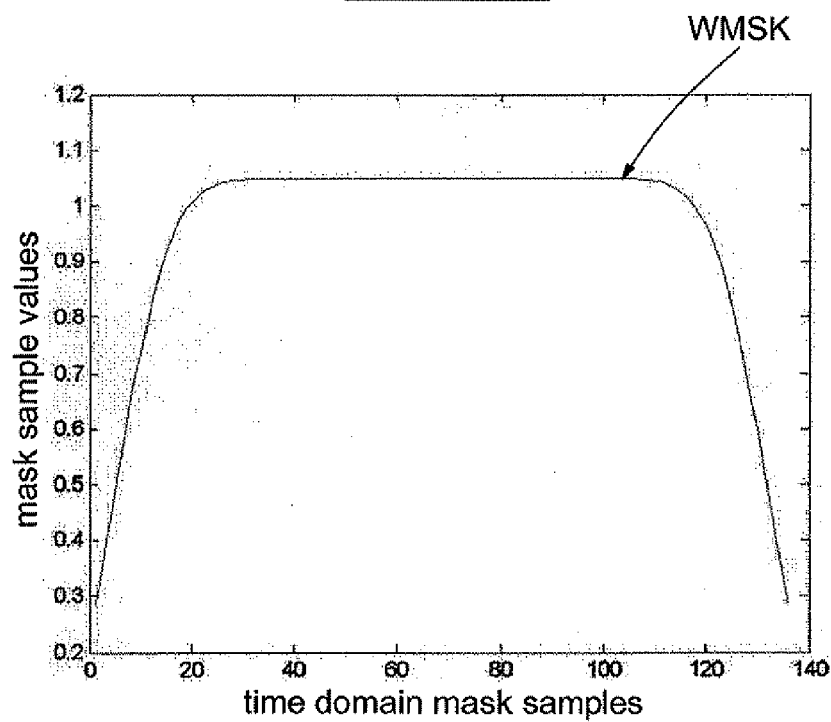

The windowing mask used in this variation is obtained in a manner essentially analogous to that disclosed with reference to FIG. 10. However, obtaining the windowing mask further comprises, as illustrated in FIG. 19, squaring 104 the samples obtained after the truncating step. An example of such a windowing mask obtained with a Gaussian function having a variance equal to 35 is depicted in FIG. 20, and the corresponding mask sample values are detailed in Table 2 of Annex A thereafter.

Conventionally, the symbols are recovered at the receiver by using an Overlap and Add (OLA) process well known by those skilled in the art. The combination of the cyclic suffix with the chosen window, followed by the overlap and add process at the receiver, allows one to compensate for the window distortion of the transmitted symbol.

Figure 21:
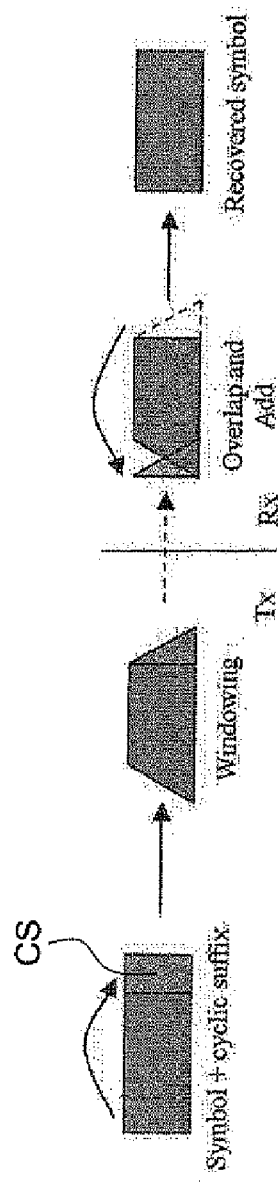

FIG. 21 depicts diagrammatically how after the OLA procedure at the receiver, the original symbol is practically recovered with no windowing distortion. As a result, the receiver performance, in terms of BER: (bit error rate) has no degradation.

Both variations of the invention that have been described require no changes in the receiver structure. In other words, whatever kind of symbol is transmitted, band notched or not, it is completely transparent to the receiver that operates in the standard mode.

Whereas the first variation introduces a minor signal spectral distortion, the second variation recovers (almost completely) the windowing distortion, at the expense of some extra complexity, and a slightly reduced time gap at the end of the symbol to cope with channel multipath.

ANNEX A

TABLE 1

| Mask sample number | Mask sample value |
|---|---|
| 1 | 0.4592 |
| 2 | 0.4983 |
| 3 | 0.5376 |
| 4 | 0.5767 |
| 5 | 0.6153 |
| 6 | 0.6530 |
| 7 | 0.6896 |
| 8 | 0.7247 |
| 9 | 0.7581 |
| 10 | 0.7895 |
| 11 | 0.8190 |
| 12 | 0.8462 |
| 13 | 0.8712 |
| 14 | 0.8940 |
| 15 | 0.9145 |
| 16 | 0.9328 |
| 17 | 0.9490 |
| 18 | 0.9632 |
| 19 | 0.9755 |
| 20 | 0.9862 |
| 21 | 0.9953 |
| 22 | 1.0030 |

TABLE 1-continued

| Mask sample number | Mask sample value |
|---|---|
| 23 | 1.0094 |
| 24 | 1.0148 |
| 25 | 1.0192 |
| 26 | 1.0228 |
| 27 | 1.0257 |
| 28 | 1.0280 |
| 29 | 1.0299 |
| 30 | 1.0313 |
| 31 | 1.0325 |
| 32 | 1.0334 |
| 33 | 1.0340 |
| 34 | 1.0345 |
| 35 | 1.0349 |
| 36 | 1.0352 |
| 37 | 1.0354 |
| 38 | 1.0356 |
| 39 | 1.0357 |
| 40 | 1.0358 |
| 41 | 1.0358 |
| 42 | 1.0359 |
| 43 | 1.0359 |
| 44 | 1.0359 |
| 45 | 1.0359 |
| 46 | 1.0359 |
| 47 | 1.0360 |
| 48 | 1.0360 |
| 49 | 1.0360 |
| 50 | 1.0360 |
| 51 | 1.0360 |
| 52 | 1.0360 |
| 53 | 1.0360 |
| 54 | 1.0360 |
| 55 | 1.0360 |
| 56 | 1.0360 |
| 57 | 1.0360 |
| 58 | 1.0360 |
| 59 | 1.0360 |
| 60 | 1.0360 |
| 61 | 1.0360 |
| 62 | 1.0360 |
| 63 | 1.0360 |
| 64 | 1.0360 |
| 65 | 1.0360 |
| 66 | 1.0360 |
| 67 | 1.0360 |
| 68 | 1.0360 |
| 69 | 1.0360 |
| 70 | 1.0360 |
| 71 | 1.0360 |
| 72 | 1.0360 |
| 73 | 1.0360 |
| 74 | 1.0360 |
| 75 | 1.0360 |
| 76 | 1.0360 |
| 77 | 1.0360 |
| 78 | 1.0360 |
| 79 | 1.0360 |
| 80 | 1.0360 |
| 81 | 1.0360 |
| 82 | 1.0360 |
| 83 | 1.0360 |
| 84 | 1.0360 |
| 85 | 1.0360 |
| 86 | 1.0360 |
| 87 | 1.0360 |
| 88 | 1.0360 |
| 89 | 1.0360 |
| 90 | 1.0360 |
| 91 | 1.0360 |
| 92 | 1.0360 |
| 93 | 1.0360 |
| 94 | 1.0360 |
| 95 | 1.0360 |
| 96 | 1.0360 |
| 97 | 1.0360 |
| 98 | 1.0360 |
| 99 | 1.0360 |
| 100 | 1.0360 |
| 101 | 1.0360 |
| 102 | 1.0360 |
| 103 | 1.0360 |
| 104 | 1.0360 |
| 105 | 1.0360 |
| 106 | 1.0360 |
| 107 | 1.0360 |
| 108 | 1.0360 |
| 109 | 1.0360 |
| 110 | 1.0360 |
| 111 | 1.0360 |
| 112 | 1.0360 |
| 113 | 1.0360 |
| 114 | 1.0360 |
| 115 | 1.0360 |
| 116 | 1.0360 |
| 117 | 1.0360 |
| 118 | 1.0360 |
| 119 | 1.0360 |
| 120 | 1.0360 |
| 121 | 1.0360 |
| 122 | 1.0360 |
| 123 | 1.0360 |
| 124 | 1.0359 |
| 125 | 1.0359 |
| 126 | 1.0359 |
| 127 | 1.0359 |
| 128 | 1.0359 |
| 129 | 1.0358 |
| 130 | 1.0358 |
| 131 | 1.0357 |
| 132 | 1.0356 |
| 133 | 1.0354 |
| 134 | 1.0352 |
| 135 | 1.0349 |
| 136 | 1.0345 |
| 137 | 1.0340 |
| 138 | 1.0334 |
| 139 | 1.0325 |
| 140 | 1.0313 |
| 141 | 1.0299 |

TABLE 2

| Mask Sample number | Mask sample value |
|---|---|
| 1 | 0.2850 |
| 2 | 0.3314 |
| 3 | 0.3804 |
| 4 | 0.4315 |
| 5 | 0.4837 |
| 6 | 0.5363 |
| 7 | 0.5884 |
| 8 | 0.6392 |
| 9 | 0.6881 |
| 10 | 0.7343 |
| 11 | 0.7774 |
| 12 | 0.8171 |
| 13 | 0.8530 |
| 14 | 0.8851 |
| 15 | 0.9135 |
| 16 | 0.9382 |
| 17 | 0.9594 |
| 18 | 0.9775 |
| 19 | 0.9926 |
| 20 | 1.0051 |
| 21 | 1.0153 |
| 22 | 1.0236 |
| 23 | 1.0303 |
| 24 | 1.0355 |
| 25 | 1.0397 |
| 26 | 1.0428 |

TABLE 2-continued

| Mask Sample number | Mask sample value |
|---|---|
| 27 | 1.0453 |
| 28 | 1.0471 |
| 29 | 1.0485 |
| 30 | 1.0495 |
| 31 | 1.0503 |
| 32 | 1.0508 |
| 33 | 1.0512 |
| 34 | 1.0515 |
| 35 | 1.0517 |
| 36 | 1.0518 |
| 37 | 1.0519 |
| 38 | 1.0520 |
| 39 | 1.0520 |
| 40 | 1.0520 |
| 41 | 1.0521 |
| 42 | 1.0521 |
| 43 | 1.0521 |
| 44 | 1.0521 |
| 45 | 1.0521 |
| 46 | 1.0521 |
| 47 | 1.0521 |
| 48 | 1.0521 |
| 49 | 1.0521 |
| 50 | 1.0521 |
| 51 | 1.0521 |
| 52 | 1.0521 |
| 53 | 1.0521 |
| 54 | 1.0521 |
| 55 | 1.0521 |
| 56 | 1.0521 |
| 57 | 1.0521 |
| 58 | 1.0521 |
| 59 | 1.0521 |
| 60 | 1.0521 |
| 61 | 1.0521 |
| 62 | 1.0521 |
| 63 | 1.0521 |
| 64 | 1.0521 |
| 65 | 1.0521 |
| 66 | 1.0521 |
| 67 | 1.0521 |
| 68 | 1.0521 |
| 69 | 1.0521 |
| 70 | 1.0521 |
| 71 | 1.0521 |
| 72 | 1.0521 |
| 73 | 1.0521 |
| 74 | 1.0521 |
| 75 | 1.0521 |
| 76 | 1.0521 |
| 77 | 1.0521 |
| 78 | 1.0521 |
| 79 | 1.0521 |
| 80 | 1.0521 |
| 81 | 1.0521 |
| 82 | 1.0521 |
| 83 | 1.0521 |
| 84 | 1.0521 |
| 85 | 1.0521 |
| 86 | 1.0521 |
| 87 | 1.0521 |
| 88 | 1.0521 |
| 89 | 1.0521 |
| 90 | 1.0521 |
| 91 | 1.0521 |
| 92 | 1.0521 |
| 93 | 1.0521 |
| 94 | 1.0521 |
| 95 | 1.0521 |
| 96 | 1.0521 |
| 97 | 1.0520 |
| 98 | 1.0520 |
| 99 | 1.0520 |
| 100 | 1.0519 |
| 101 | 1.0518 |
| 102 | 1.0517 |
| 103 | 1.0515 |
| 104 | 1.0512 |
| 105 | 1.0508 |
| 106 | 1.0503 |
| 107 | 1.0495 |
| 108 | 1.0485 |
| 109 | 1.0471 |
| 110 | 1.0453 |
| 111 | 1.0428 |
| 112 | 1.0397 |
| 113 | 1.0355 |
| 114 | 1.0303 |
| 115 | 1.0236 |
| 116 | 1.0153 |
| 117 | 1.0051 |
| 118 | 0.9926 |
| 119 | 0.9775 |
| 120 | 0.9594 |
| 121 | 0.9382 |
| 122 | 0.9135 |
| 123 | 0.8851 |
| 124 | 0.8530 |
| 125 | 0.8171 |
| 126 | 0.7774 |
| 127 | 0.7343 |
| 128 | 0.6881 |
| 129 | 0.6392 |
| 130 | 0.5884 |
| 131 | 0.5363 |
| 132 | 0.4837 |
| 133 | 0.4315 |
| 134 | 0.3804 |
| 135 | 0.3314 |
| 136 | 0.2850 |
| 137 | 0 |
| 138 | 0 |
| 139 | 0 |
| 140 | 0 |
| 141 | 0 |
| 142 | 0 |
| 143 | 0 |
| 144 | 0 |
| 145 | 0 |
| 146 | 0 |
| 147 | 0 |
| 148 | 0 |
| 149 | 0 |
| 150 | 0 |
| 151 | 0 |
| 152 | 0 |
| 153 | 0 |
| 154 | 0 |
| 155 | 0 |
| 156 | 0 |
| 157 | 0 |
| 158 | 0 |
| 159 | 0 |
| 160 | 0 |
| 161 | 0 |
| 162 | 0 |
| 163 | 0 |
| 164 | 0 |
| 165 | 0 |

That which is claimed:

1. A method for notching a transmission band of an analog signal to be transmitted and including sub-carriers to be modulated from digital modulation coefficients respectively associated to the sub-carriers, the method comprising:
removing sub-carriers within a portion of the transmission band to be notched, the removing comprising providing an initial digital signal from successive frequency-domain groups each containing the digital modulation coefficients respectively associated to the sub-carriers, filtering the initial digital signal with a frequency resolution greater than the frequency resolution of the frequency-domain groups to remove frequencies corresponding to the sub-carriers to be removed, and windowing the filtered digital signal using a windowing mask having a representation in the frequency-domain including a main lobe and secondary lobes, with a power spectrum of the main lobe and secondary lobes decreasing faster than an inverse of the frequency squared.

2. A method according to claim 1, wherein the windowing mask is based upon a rectangle mask and a Gaussian function.

3. A method according to claim 2, wherein providing the windowing mask comprises:

providing a time-domain rectangle mask;

performing a time-domain to frequency-domain conversion processing of the rectangle mask with a resolution greater than a frequency resolution of the rectangle mask for obtaining a frequency-domain resulting mask;

multiplying the resulting mask with a Gaussian function for obtaining a modified mask;

performing a frequency-domain to time-domain conversion processing on the modified mask for obtaining an intermediate time-domain mask, and truncating the intermediate time-domain mask.

4. A method according to claim 2, wherein a variance of the Gaussian function is greater than or equal to 10 and smaller than or equal to 150.

5. A method according to claim 1, wherein providing the initial digital signal comprises providing successive initial frequency-domain symbols respectively corresponding to the successive groups of the digital modulation coefficients.

6. A method according to claim 1, wherein providing the initial digital signal comprises respectively performing successive frequency-domain to time-domain conversion processing on the successive groups of digital modulation coefficients for obtaining successive initial time-domain symbols.

7. A method according to claim 1, wherein providing the initial digital signal comprises respectively performing successive frequency-domain to time-domain conversion processing on the successive groups of digital modulation coefficients for obtaining successive intermediate time-domain symbols, and adding a suffix to each intermediate symbol for obtaining successive initial time-domain symbols, the suffix of an intermediate symbol being a copy of at least a first sample of the intermediate symbol.

8. A method according to claim 7, wherein each group of digital modulation coefficients comprises a first number of modulation coefficients corresponding to a first number of modulated sub-carriers, and the signal to be transmitted comprises successive time-domain symbols including a second number of samples, the second number being greater than the first number, and the suffix of an intermediate symbol is a copy of the N first samples of the intermediate symbol, with N being greater than one and smaller than a difference between the second number and the first number.

9. A method according to claim 3, further comprising squaring samples from the intermediate time-domain mask obtained after the truncating step.

10. A method according to claim 2, wherein a variance of the Gaussian function is greater than or equal to 20 and smaller than or equal to 60.

11. A method according to claim 1, wherein filtering the initial digital signal is performed in the frequency-domain.

12. A method according to claim 1, wherein filtering said initial digital signal is performed in the time-domain.

13. A method according to claim 1, wherein a frequency resolution of the filtering is an integer multiple of a frequency resolution of the frequency-domain groups.

14. A method according to claim 1, wherein the filtered signal is a frequency-domain signal and windowing the filtered signal comprises performing a frequency-domain to time-domain conversion processing on the filtered signal before using the windowing mask.

15. A method according to claim 1, further comprising performing a digital-to-analog conversion processing of the windowed signal on a number of bits greater than 5.

16. A method according to claim 1, wherein the signal comprises an UWB signal modulated according to a MB-OFDM modulation scheme.

17. A device for notching a transmission band of an analog signal to be transmitted and including sub carriers to be modulated from digital modulation coefficients respectively associated to the sub-carriers, the device comprising:

a processor to remove subcarriers within a portion of the transmission band to be notched, said processor comprising an input for receiving successive frequency-domain groups each containing the digital modulation coefficients respectively associated to the subcarriers, a preprocessor for providing an initial digital signal from the successive frequency-domain groups, a filter for filtering the initial signal with a frequency resolution greater than the frequency resolution of the frequency-domain groups to remove frequencies corresponding to the sub carriers to be removed, and a windowing unit to window the filtered signal using a windowing mask having a representation in the frequency-domain including a main lobe and secondary lobes, a power spectrum of the main lobe and secondary lobes decreasing faster than an inverse of the frequency squared.

18. A device according to claim 17, wherein said windowing unit comprises a memory containing digital windowing coefficients defining the windowing mask, the windowing coefficients having being obtained based upon a rectangle mask and a Gaussian function, and a multiplier for multiplying the filtered signal by the windowing coefficients.

19. A device according to claim 18, wherein a variance of the Gaussian function is greater than or equal to 10 and smaller than or equal to 250.

20. A device according to claim 17, wherein the initial digital signal comprises successive initial frequency-domain symbols respectively corresponding to the successive groups of digital modulation coefficients.

21. A device according to claim 17, wherein said preprocessor comprises frequency-domain to time-domain conversion processing for respectively performing successive frequency-domain to time-domain conversion processing on the successive groups of the digital modulation coefficients for obtaining successive initial time-domain symbols.

22. A device according to claim 17, wherein said preprocessor comprises frequency-domain to time-domain conversion processing to respectively perform successive frequency-domain to time-domain conversion processing on the successive groups of digital modulation coefficients for obtaining successive intermediate time-domain symbols, and an adder for adding a suffix to each intermediate symbol for obtaining successive initial time-domain symbols, the suffix of an intermediate symbol being a copy of at least the first sample of the intermediate symbol.

23. A device according to claim 22, wherein each group of modulation coefficients comprises a first number of modulation coefficients corresponding to a first number of modulated subcarriers, and the signal to be transmitted comprises successive time-domain symbols including a second number of samples, the second number being greater than the first number, and the suffix of an intermediate symbol is a copy of N first samples of the intermediate symbol, with N being greater than one and smaller than a difference between the second number and said first number.

24. A device according to claim 17, wherein said filter filters the initial digital signal in the frequency-domain.

25. A device according to claim 17, wherein said filter filters the initial digital signal in the time domain.

26. A device according to claim 17, wherein the filtered signal is a frequency-domain signal and said windowing unit comprises frequency-domain to time-domain conversion processing for performing a frequency-domain to time-domain conversion processing on the filtered signal before using the windowing mask.

27. A device according to claim 17, further comprising a digital-to-analog conversion stage coupled to an output of said windowing unit for performing a digital-to analog conversion of the windowed signal on a number of bits greater than 5.

28. A device according to claim 17, wherein the signal comprises an UWB signal modulated according to a MB-OFDM modulation scheme.

29. A transmitter comprising:
a digital baseband stage for notching a transmission band of an analog signal to be transmitted and including subcarriers to be modulated from digital modulation coefficients respectively associated to the sub-carriers, said digital baseband stage comprising a processor for removing subcarriers within a portion of the transmission band to be notched, said processor configured to perform the following
receiving successive frequency-domain groups each containing the digital modulation coefficients respectively associated to the sub carriers,
providing an initial digital signal from the successive frequency-domain groups,
filtering the initial signal with a frequency resolution greater than the frequency resolution of the frequency-domain groups to remove frequencies corresponding to the sub-carriers to be removed, and
windowing the filtered signal using a windowing mask having a representation in the frequency-domain including a main lobe and secondary lobes, a power spectrum of the main lobe and secondary lobes decreasing faster than an inverse of the frequency squared;

a digital-to-analog conversion stage coupled to said digital baseband stage for converting the windowed signal to an analog signal; and
an analog stage coupled to said digital-to-analog conversion stage for transmitting the windowed signal.

30. A transmitter according to claim 29, further comprising a memory for containing digital windowing coefficients defining the windowing mask, the windowing coefficients having being obtained based upon a rectangle mask and a Gaussian function, and by multiplying the filtered signal by the windowing coefficients.

31. A transmitter according to claim 29, wherein the initial digital signal comprises successive initial frequency-domain symbols respectively corresponding to the successive groups of digital modulation coefficients.

32. A transmitter according to claim 29, wherein said processor comprises frequency-domain to time-domain conversion processing for respectively performing successive frequency-domain to time-domain conversion processing on the successive groups of the digital modulation coefficients for obtaining successive initial time-domain symbols.

33. A transmitter according to claim 29, wherein said processor comprises frequency-domain to time domain conversion processing to respectively perform successive frequency-domain to time-domain conversion processing on the successive groups of digital modulation coefficients for obtaining successive intermediate time domain symbols, and adder processing for adding a suffix to each intermediate symbol for obtaining successive initial time-domain symbols, the suffix of an intermediate symbol being a copy of at least the first sample of the intermediate symbol.

34. A transmitter according to claim 33, wherein each group of modulation coefficients comprises a first number of modulation coefficients corresponding to a first number of modulated subcarriers, and the signal to be transmitted comprises successive time-domain symbols including a second number of samples, the second number being greater than the first number, and the suffix of an intermediate symbol is a copy of N first samples of the intermediate symbol, with N being greater than one and smaller than a difference between the second number and the first number.

35. A transmitter according to claim 29, wherein the filtered signal is a frequency-domain signal and said processor comprises frequency-domain to time-domain conversion processing for performing a frequency-domain to time-domain conversion processing on the filtered signal before using the windowing mask.

36. A transmitter according to claim 29, wherein the signal comprises an UWB signal modulated according to a MB-OFDM modulation scheme.

* * * * *

UNITED STATES PATENT AND TRADEMARK OFFICE
CERTIFICATE OF CORRECTION

PATENT NO. : 7,720,163 B2
APPLICATION NO. : 11/612846
DATED : May 18, 2010
INVENTOR(S) : Kirsch et al.

It is certified that error appears in the above-identified patent and that said Letters Patent is hereby corrected as shown below:

| | |
|---|---|
| Column 1, Line 19 | Delete: "fix"<br>Insert: --fixed-- |
| Column 2, Line 64 | Delete: "windows"<br>Insert: --window-- |
| Column 5, Line 46 | Delete: "illustrates a diagrammatically"<br>Insert: --illustrates diagrammatically-- |
| Column 8, Line 1 | Delete: "3"<br>Insert: --8-- |
| Column 8, Line 42 | Delete: "been"<br>Insert: --being-- |
| Column 9, Line 42 | Delete: "to 17"<br>Insert: --to FIGS. 17-- |
| Column 16, Line 44 | Delete: "being"<br>Insert: --been-- |
| Column 16, Line 49 | Delete: "250"<br>Insert: --150-- |
| Column 17, Line 16 | Delete: "time domain"<br>Insert: --time-domain-- |
| Column 17, Line 25 | Delete: "digital-to analog"<br>Insert: --digital-to-analog-- |
| Column 17, Line 37 | Delete: "subcarriers"<br>Insert: --sub-carriers-- |

Signed and Sealed this

Fifth Day of October, 2010

David J. Kappos
*Director of the United States Patent and Trademark Office*

CERTIFICATE OF CORRECTION (continued)
U.S. Pat. No. 7,720,163 B2

| | |
|---|---|
| Column 17, Line 42 | Delete: "sub carriers"<br>Insert: --sub-carriers-- |
| Column 18, Line 9 | Delete: "being"<br>Insert: --been-- |
| Column 18, Line 24 | Delete: "time domain"<br>Insert: --time-domain-- |
| Column 18, Line 37 | Delete: "subcarriers"<br>Insert: --sub-carriers-- |